US012658443B2

(12) United States Patent
Shen et al.

(10) Patent No.: US 12,658,443 B2

(45) Date of Patent: Jun. 16, 2026

(54) SECONDARY BATTERY, APPARATUS, ARTIFICIAL GRAPHITE AND PREPARATION METHOD THEREOF

(71) Applicant: CONTEMPORARY AMPEREX TECHNOLOGY (HONG KONG) LIMITED, Hong Kong (CN)

(72) Inventors: Rui Shen, Ningde City (CN); Libing He, Ningde City (CN); Yuanyuan Li, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 909 days.

(21) Appl. No.: 17/345,201

(22) Filed: Jun. 11, 2021

(65) Prior Publication Data

US 2021/0313575 A1 Oct. 7, 2021

Related U.S. Application Data

(63) Continuation of application No. PCT/CN2019/122652, filed on Dec. 3, 2019.

(51) Int. Cl.
H01M 4/587 (2010.01)
C01B 32/205 (2017.01)
(Continued)

(52) U.S. Cl.
CPC ........... H01M 4/587 (2013.01); C01B 32/205 (2017.08); H01M 4/133 (2013.01);
(Continued)

(58) Field of Classification Search
CPC .................................................. H01M 4/587
See application file for complete search history.

(56) References Cited

U.S. PATENT DOCUMENTS

2013/0164618 A1* 6/2013 Konishi ................ H01M 4/623
429/217
2014/0138591 A1* 5/2014 Yoon
(Continued)

FOREIGN PATENT DOCUMENTS

CN 102637859 A 8/2012
CN 107799813 A * 3/2018 ........ H01M 10/0525
(Continued)

OTHER PUBLICATIONS

The extended European search report for EP Application No. 19954712.6, dated Nov. 29, 2021, 9 pages.
(Continued)

*Primary Examiner* — Nicole M. Buie-Hatcher
*Assistant Examiner* — Krishna R Hammond
(74) *Attorney, Agent, or Firm* — K&L Gates LLP

(57) ABSTRACT

The present application discloses a secondary battery comprising a negative electrode plate, an apparatus including the secondary battery, an artificial graphite and a preparation method thereof, the negative electrode plate comprising a negative active material, wherein the negative active material comprises an artificial graphite having a volume average particle size $D_v50$ of 12 μm to 22 μm, and satisfying: $12 \leq D_v50 \times SSA \leq 25$, in which SSA is the specific surface area of artificial graphite, in $m^2/g$; the negative electrode plate has a compaction density of 1.6 $g/cm^3$ to 1.75 $g/cm^3$ and an OI value of at most 15, wherein the OI value represents a ratio $C_{004}/C_{110}$, in which $C_{004}$ is the peak area of the diffraction peak of 004 crystal plane of artificial graphite in the negative electrode plate and $C_{110}$ is the peak area of the diffraction peak of 110 crystal plane of artificial graphite in the negative electrode plate.

19 Claims, 3 Drawing Sheets

(51) Int. Cl.
    *H01M 4/02*      (2006.01)
    *H01M 4/133*      (2010.01)

(52) U.S. Cl.
    CPC ...... *C01P 2002/74* (2013.01); *C01P 2004/03* (2013.01); *C01P 2004/61* (2013.01); *C01P 2006/10* (2013.01); *C01P 2006/11* (2013.01); *C01P 2006/12* (2013.01); *C01P 2006/40* (2013.01); *H01M 2004/021* (2013.01); *H01M 2004/027* (2013.01); *H01M 2220/20* (2013.01)

(56) References Cited

U.S. PATENT DOCUMENTS

| | | | |
|---|---|---|---|
| 2018/0269468 A1 * | 9/2018 | Sasagawa | |
| 2019/0097271 A1 | 3/2019 | Wang et al. | |
| 2019/0305293 A1 | 10/2019 | Sotowa et al. | |
| 2019/0348667 A1 | 11/2019 | Kang et al. | |
| 2021/0020906 A1 * | 1/2021 | Yamazaki | |

FOREIGN PATENT DOCUMENTS

| | | | | |
|---|---|---|---|---|
| CN | 108155351 A | * | 6/2018 | ............ C01B 32/21 |
| CN | 108807847 A | | 11/2018 | |
| CN | 108807848 A | | 11/2018 | |
| CN | 108807849 A | * | 11/2018 | .......... H01M 10/045 |
| CN | 108832075 A | * | 11/2018 | ........ H01M 10/0525 |
| CN | 109704323 A | | 5/2019 | |
| CN | 109817886 A | | 5/2019 | |
| CN | 109830669 A | | 5/2019 | |
| CN | 110416497 A | | 11/2019 | |
| JP | 2004127913 A | | 4/2004 | |
| JP | 2005154242 A | | 6/2005 | |
| JP | 2010062113 A | | 3/2010 | |
| JP | 2012023048 A | | 2/2012 | |
| JP | 2012023049 A | * | 2/2012 | ............. H01M 4/04 |
| JP | 2012133981 A | | 7/2012 | |
| JP | 2013211254 A | | 10/2013 | |
| JP | 2014038851 A | * | 2/2014 | ........ H01M 10/0525 |
| JP | 2014179346 A | | 9/2014 | |
| JP | 2014197496 A | | 10/2014 | |
| JP | 2016115418 A | | 6/2016 | |
| JP | 2017174739 A | | 9/2017 | |
| JP | 6638513 B2 | * | 1/2020 | |
| KR | 20160014539 A | | 2/2016 | |
| KR | 20170002302 A | | 1/2017 | |
| KR | 20170007140 A | | 1/2017 | |
| KR | 20170048210 A | | 5/2017 | |
| KR | 20180015251 A | | 2/2018 | |
| KR | 20190062319 A | | 6/2019 | |
| WO | WO-2019124425 A1 | * | 6/2019 | .......... C01B 32/205 |

OTHER PUBLICATIONS

The First Office Action for EP Application No. 19954712.6, dated Jun. 22, 2022, 5 pages.
The First Office Action for CN Application No. 201980066376.3, dated Jan. 25, 2024, 16 pages.
The First Office Action for JP Application No. 2022-520026, dated Apr. 10, 2023, 10 pages.
The First Office Action for IN Application No. 202227019494, dated Aug. 31, 2022, 7 pages.
PCT International Search Report for PCT/CN2019/122652, dated Aug. 26, 2020, 12 pages.
The Second Office Action for JP Application No. 2022-520026, dated Jul. 10, 2023, 8 pages.
The Notice of Allowance for Chinese Application No. 201980066376. 3, dated Nov. 27, 2024, 7 pages.
The Extended European Search Report for EP Application No. 24171005.2, dated Sep. 25, 2024, 9 pages.
The First Office Action for Korean Application No. 10-2022-7012037, dated Aug. 7, 2024, 18 pages.

\* cited by examiner

SECONDARY BATTERY, APPARATUS, ARTIFICIAL GRAPHITE AND PREPARATION METHOD THEREOF

CROSS-REFERENCE TO RELATED APPLICATION

This application is a continuation of International Application No. PCT/CN2019/122652, filed on Dec. 3, 2019.

TECHNICAL FIELD

The present application belongs to the technical field of secondary batteries, and specifically relates to a secondary battery, an apparatus, an artificial graphite and preparation method thereof.

BACKGROUND

Secondary batteries are widely used due to their outstanding features such as high energy density, no pollution, and long service life.

However, the volume of the secondary battery will expand during the cycle, which causes the internal stress of the battery to increase, thus affecting the service life and safety performance of the battery. For example, with the rapid popularity of new energy vehicles, the market has increasingly higher requirements for the service life and safety performance of power-type secondary batteries. In order to enhance the market competitiveness of new energy vehicles, it is indeed necessary to provide a new technology that can reduce the volume expansion of secondary batteries.

SUMMARY

The present application provides a secondary battery that can have low cyclic expansion, an apparatus including the secondary battery, artificial graphite that can reduce the volume expansion of the secondary battery during the cycle, and a preparation method thereof.

In order to achieve the above object, a first aspect of the present application provides a secondary battery including a negative electrode plate, the negative electrode plate including a negative active material, wherein the negative active material includes an artificial graphite having a volume average particle size $D_v50$ of 12 μm to 22 μm, and the artificial graphite satisfies: $12 \leq D_v50 \times SSA \leq 25$, in which SSA is the specific surface area of the artificial graphite, in $m^2/g$; the negative electrode plate has a compaction density of 1.6 $g/cm^3$ to 1.75 $g/cm^3$, and the negative electrode plate has an OI value ≤15, wherein the OI value of the negative electrode plate represents a ratio $C_{004}/C_{110}$, in which $C_{004}$ is the peak area of the diffraction peak of 004 crystal plane of the artificial graphite in the negative electrode plate and $C_{110}$ is the peak area of the diffraction peak of 110 crystal plane of the artificial graphite in the negative electrode plate. The peak area of the diffraction peak can be obtained by X-ray diffraction pattern test.

A second aspect of the present application provides an apparatus including the secondary battery according to the first aspect of the present application.

The third aspect of the present application provides an artificial graphite, wherein the artificial graphite has a volume average particle size $D_v50$ of 12 μm to 22 μm, and the artificial graphite satisfies: $12 \leq D_v50 \times SSA \leq 25$, in which SSA is the specific surface area of the artificial graphite, in $m^2/g$; when the artificial graphite is used in a negative electrode with a compaction density of 1.6 $g/cm^3$ to 1.75 $g/cm^3$, the artificial graphite has a peak area $C_{004}$ of the 004 crystal plane and a peak area $C_{110}$ of the 110 crystal plane satisfying $C_{004}/C_{110} \leq 15$.

The fourth aspect of the present application provides a method for preparing an artificial graphite, including the following steps:
- (1) crushing green coke materials and classifying them;
- (2) shaping the product obtained in step (1);
- (3) granulating the product obtained in step (2);
- (4) subjecting the product obtained in step (3) to a graphitization treatment at a temperature of 2800° C.~3200° C. to obtain the artificial graphite;
- wherein the artificial graphite has a volume average particle size $D_v50$ of 12 μm to 22 μm, and the artificial graphite satisfies: $12 \leq D_v50 \times SSA \leq 25$, in which SSA is the specific surface area of the artificial graphite, in $m^2/g$; when the artificial graphite is used in a negative electrode with a compaction density of 1.6 $g/cm^3$ to 1.75 $g/cm^3$, the artificial graphite has a peak area $C_{004}$ of the 004 crystal plane and a peak area $C_{110}$ of the 110 crystal plane satisfying $C_{004}/C_{110} \leq 15$.

A fifth aspect of the present application provides a method for preparing a secondary battery, including the step of using the artificial graphite described in the third aspect of the present application to prepare a negative electrode plate.

In the secondary battery provided in the present application, the negative active material includes an artificial graphite, and when the compaction density of the negative electrode plate is from 1.6 $g/cm^3$ to 1.75 $g/cm^3$, the ratio of the peak area $C_{004}$ of 004 crystal plane to the peak area $C_{110}$ of 110 crystal plane of the artificial graphite is within a specific range, so its directional selectivity during the lithium intercalation process is significantly reduced, which can reduce the volume expansion of the negative electrode plate and the secondary battery during the cycle. At the same time, the artificial graphite has a suitable volume average particle size $D_v50$, and the specific relationship between $D_v50$ and the specific surface area SSA is satisfied, which can make the artificial graphite have a higher surface stability, reduce the side reaction between it and the electrolyte, and reduce gas production. Under the combined effect of the above conditions, the cyclic expansion of the secondary battery is greatly reduced, so that the cycle life and safety performance of the secondary battery can be effectively improved. The apparatus of the present application includes the secondary battery provided by the present application, and thus has at least the same advantages as the secondary battery.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
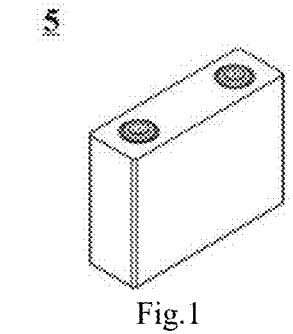
FIG. 1 is a schematic diagram of a secondary battery provided by an embodiment of the present application.

Among them, the reference signs are explained as follows:

1. Battery pack;
2. Upper case body;
3. Lower case body;
4. Battery module;
5. Secondary battery.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description herein, it should be noted that, unless otherwise stated, the recitation of numerical ranges by "no less than" and "no more than" include all numbers within that range including the endpoints. As used herein, "a", "an", "the", "at least one", and "one or more" are used interchangeably, unless indicated otherwise and the recitation of "more" in the phrase "one or more" includes two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

As an economical, practical, clean and easily controllable and convertible energy form, electric energy is increasingly used in various apparatus. Secondary batteries have become the preferred power source for apparatus due to their advantages of high energy density, portability, no memory effect, and environmental friendliness.

[Secondary Battery]

Thus, a first aspect of the present application provides a secondary battery.

The secondary battery comprises a positive electrode plate, a negative electrode plate, and an electrolyte. During the charging and discharging process of the battery, active ions are inserted and extracted back and forth between the positive electrode plate and the negative electrode plate. The electrolyte conducts ions between the positive electrode plate and the negative electrode plate.

[Negative Electrode Plate]

The negative electrode plate comprises a negative electrode current collector and a negative electrode film disposed on at least one surface of the negative electrode current collector. As an example, the negative electrode current collector has two opposite surfaces in its own thickness direction, and the negative electrode film is laminated on either or both of the two opposite surfaces of the negative electrode current collector.

The negative electrode current collector can be made of materials with good electrical conductivity and mechanical strength to play the role of conduction and current collection. In some embodiments, a copper foil may be used as the negative electrode current collector.

The negative electrode film comprises a negative active material, and the negative active material comprises artificial graphite.

The inventors have done a lot of research to provide an artificial graphite with low expansion performance. The artificial graphite has a volume average particle size $D_v50$ of 12 μm to 22 μm, and the artificial graphite satisfies: $12 \leq D_v50 \times SSA \leq 25$, in which SSA is the specific surface area of the artificial graphite, in $m^2/g$; the negative electrode plate has a compaction density of 1.6 $g/cm^3$ to 1.75 $g/cm^3$, and the negative electrode plate has an OI value $\leq 15$, wherein the OI value of the negative electrode plate represents a ratio $C_{004}/C_{110}$, in which $C_{004}$ is the peak area of the diffraction peak of 004 crystal plane of the artificial graphite in the negative electrode plate and $C_{110}$ is the peak area of the diffraction peak of 110 crystal plane of the artificial graphite in the negative electrode plate. The peak area of the diffraction peak can be obtained by X-ray diffraction pattern test.

In the present application, $D_v50 \times SSA$ only involves calculation of numerical values. For example, if the $D_v50$ of artificial graphite is 16.2 μm and the SSA is 1.15 $m^2/g$, then the $D_v50 \times SSA$ of artificial graphite is $16.2 \times 1.15 \approx 18.6$.

The inventors of the present application found that when the volume average particle size $D_v50$ of artificial graphite is appropriate, and the specific relationship between $D_v50$ and specific surface area SSA is satisfied, it can make the artificial graphite have higher surface stability, reduce the side reaction between the artificial graphite and the electrolyte, and further reduce gas production. At the same time, artificial graphite also satisfies that when the compaction density of the negative electrode plate is from 1.6 $g/cm^3$ to 1.75 $g/cm^3$, the ratio of the peak area of 004 crystal plane to the peak area of 110 crystal plane of the artificial graphite is within a specific range, thus direction selectivity during the lithium intercalation process is significantly reduced, and the lithium intercalation-induced expansion can be distributed in all directions, thereby reducing the volume expansion of the negative electrode plate and the secondary battery during the cycle. Under the combined effect of the above conditions, the cyclic expansion of artificial graphite is greatly reduced. The cyclic expansion of the negative electrode plate and the secondary battery using the artificial graphite is therefore also significantly reduced.

The volume increase of the secondary battery during the cycle is smaller, which is conducive to making it have a higher energy density. In particular, a secondary battery with a low cyclic expansion can maintain an internal structure suitable for electrolyte infiltration during the cycle, so that the electrolyte is fully infiltrated in the battery core, and thus can improve the cycle life of the secondary battery. The lower cyclic expansion can also reduce the internal stress of the battery core of the secondary battery, reduce the deformation of the battery core under the action of the internal stress, and effectively improve the safety performance of the secondary battery. The safety performance of the apparatus using the secondary battery can therefore be improved.

In some embodiments, when the compaction density of the negative electrode plate is from 1.6 g/cm³ to 1.75 g/cm³, the OI value of the negative electrode plate may be ≤15, ≤13, ≤12, and ≤11.5. If the OI value of the negative electrode plate is small, the direction selectivity of the artificial graphite during the lithium intercalation process is small, and the lithium intercalation-induced expansion can be distributed in all directions, thereby reducing the cyclic expansion of the electrode plate and the battery. Further, when the compaction density of the negative electrode plate is from 1.6 g/cm³ to 1.75 g/cm³, the OI value of the negative electrode plate can be ≥6, ≥7, ≥8, ≥8.5. In such case, the artificial graphite in the negative electrode plate and the negative electrode current collector can have a higher bonding force, thereby further reducing the cyclic expansion of the electrode plate and the battery.

Preferably, when the compaction density of the negative electrode plate is from 1.6 g/cm³ to 1.75 g/cm³, the OI value of the negative electrode plate is from 8 to 12.

The negative electrode plate has a higher compaction density, which enables the secondary battery to obtain a higher energy density, thereby improving the endurance of the apparatus. In some embodiments, the compaction density of the negative electrode plate is preferably from 1.6 g/cm³ to 1.7 g/cm³; more preferably from 1.62 g/cm³ to 1.68 g/cm³. In this way, the negative electrode plate can have a high compaction density and at the same time have a porosity suitable for full infiltration of the electrolyte. Therefore, the capacity of the battery can be used more effectively, and the battery can obtain better kinetic performance.

In some embodiments, the value of $D_v50 \times SSA$ of artificial graphite may be ≥12, ≥13, ≥14, ≥15, ≥16; and may be ≤25, ≤23, ≤22, ≤21, ≤20, ≤18. Preferably, $D_v50 \times SSA$ is at least 15 and at most 22. More preferably, $D_v50 \times SSA$ is at least 16 and at most 21. A proper $D_v50 \times SSA$ value can further improve the surface stability of artificial graphite.

In some embodiments, the specific surface area SSA of the artificial graphite may be from 0.5 m²/g to 2.0 m²/g. For example, the specific surface area SSA of the artificial graphite can be 0.5 m²/g or more, 0.7 m²/g or more, 0.8 m²/g or more, 1 m²/g or more; and can be 2.0 m²/g or less, 1.8 m²/g or less, 1.5 m²/g or less, 1.3 m²/g or less. Preferably, the specific surface area SSA of the artificial graphite measured by BET method is from 0.8 m²/g to 1.5 m²/g.

The artificial graphite has an appropriate specific surface area, which can reduce the side reactions of the electrolyte on its surface and reduce the gas production, thereby reducing the volume expansion of the secondary battery during the cycle. At the same time, the artificial graphite can have higher electrochemical reaction activity, so that the secondary battery has higher kinetic performance, which is conducive to meeting the power requirements of the apparatus. In addition, a proper specific surface area can also make the artificial graphite and the binder have a strong bonding force, which can improve the cohesion and bonding force of the electrode plate, thereby further reducing the cyclic expansion of the secondary battery.

In some embodiments, the particle size $D_v50$ of the artificial graphite may be from 12 μm to 20 μm. For example, the $D_v50$ of the artificial graphite may be from 13 μm to 18 μm, preferably from 15 μm to 18 μm.

A suitable $D_v50$ makes the artificial graphite have higher performance for transporting active ion and electron, and at the same time, it can also reduce the side reaction of the electrolyte in the negative electrode. In addition, artificial graphite with a suitable $D_v50$ is also beneficial to increasing its own powder compaction density, so that the electrode plate using the artificial graphite can obtain a higher compaction density, and therefore can increase the energy density of the battery.

In some embodiments, the particle size $D_v10$ of the artificial graphite is at least 6 μm. For example, the $D_v10$ of the artificial graphite can be ≥6 μm, ≥6.5 μm, ≥7 μm, or ≥7.5 μm. The artificial graphite has a small active specific surface area, which can further reduce side reactions in the secondary battery. Further, the $D_v10$ of the artificial graphite may be ≤11 μm, ≤10.5 μm, ≤10 μm, ≤9.5 μm, or ≤9 μm, which is conducive to making the electrode plate obtain a higher compaction density. Preferably, 6.5 μm≤$D_v10$≤10.5 μm.

The particle size span of artificial graphite is defined as Span=$(D_v90-D_v10)/D_v50$. In some embodiments, the particle size span of the artificial graphite may be from 1.1 to 1.8, preferably from 1.2 to 1.5.

If the particle size span of the artificial graphite is appropriate, the artificial graphite contains an appropriate amount of larger particles and smaller particles, which can improve the stacking performance between the artificial graphite, and the negative electrode plate adopting it has an appropriate porosity. At the same time, the artificial graphite can also have a proper active specific surface area, so that it has both higher electrochemical reaction activity and higher surface stability. Therefore, there are fewer side reactions of the electrolyte on the surface of the artificial graphite, which can greatly reduce the consumption of the electrolyte caused by side reactions and the increase in the thickness of the SEI (solid electrolyte interphase) film on the surface of the material. In this way, the low cyclic expansion performance of the battery is further improved.

In addition, the appropriate particle size span (Span) can also make the artificial graphite have a higher tap density and powder compaction density. The compaction density of the electrode plate using the artificial graphite is therefore relatively high, which can increase the energy density of the battery.

In some preferred embodiments, the artificial graphite also optionally satisfies that the $D_v50$ of the artificial graphite is from 12 μm to 22 μm, $D_v10$≥6 μm, and $(D_v90-D_v10)/D_v50$ is from 1.1 to 1.8. The artificial graphite has better particle matching, and can obtain a higher stacking density, thereby increasing the powder compaction density of the artificial graphite, which is beneficial to increasing the energy density of the battery. In addition, the artificial graphite has a better matching effect between particles, which can enable the negative electrode plate to have higher liquid phase ion transport performance and solid phase ion transport performance, thereby ensuring that the battery has good kinetic performance.

The inventor found that the artificial graphite having an appropriate graphitization degree G can have a higher gram capacity and a higher phase structural stability at the same time. In some embodiments, the graphitization degree G of the artificial graphite is from 92% to 95%, more preferably from 92% to 94%.

The graphitization degree of artificial graphite within the above range can make the artificial graphite have a higher powder compaction density and gram capacity. In particular, the graphitization degree G within the above range can also prevent the artificial graphite from co-intercalation of a solvent during the battery cycle, and the graphite layer is not easily peeled off, thereby reducing the cyclic expansion of the electrode plate and the battery. At the same time, the structural stability of the artificial graphite is higher, and it is not easy to disintegrate during the rolling process of preparing the negative electrode plate. Therefore, the cohesion between the particles in the electrode plate is relatively high, which can reduce the expansion the electrode plate and the battery during cycle process.

In some embodiments, the tap density of artificial graphite may be from 0.85 $g/cm^3$ to 1.35 $g/cm^3$, preferably from 0.95 $g/cm^3$ to 1.15 $g/cm^3$.

In some embodiments, the powder compaction density of artificial graphite under a pressure of 2000 kg is from 1.65 $g/cm^3$ to 1.85 $g/cm^3$, preferably from 1.68 $g/cm^3$ to 1.83 $g/cm^3$.

The artificial graphite has a higher powder compaction density under a pressure of 2000 kg, and the negative electrode plate using the artificial graphite can have a higher compaction density, so that the battery has a higher energy density.

In some preferred embodiments, the numerical particle size $D_n10$ of the artificial graphite is ≥1 μm. For example, $D_n10$ can be ≥1.2 μm, ≥1.3 μm, ≥1.5 μm. The artificial graphite has a suitable $D_n10$, which can make it have a higher gram capacity. In addition, the $D_n10$ of the artificial graphite makes its active specific surface area smaller, so there are fewer side reactions between the artificial graphite and the electrolyte, and the cyclic expansion of the battery can be further reduced.

Further, the $D_n10$ of the artificial graphite is ≤4 μm. For example, $D_n10$ is ≤4 μm, ≤3 μm, or ≤2.5 μm. In the artificial graphite containing an appropriate amount of smaller particles, the smaller particles can be filled in the pores between the larger particles, so that the artificial graphite can have a higher tap density and powder compaction density. Thus, the negative electrode plate using such artificial graphite can obtain a higher electrode plate compaction density, so that the energy density of the battery can be further improved. Preferably, 1 μm≤$D_n10$≤3 μm.

Peak D and Peak G are Raman characteristic peaks of graphite materials. The Peak D and Peak G of the artificial graphite can be measured by laser Raman spectroscopy, such as Advantage 785TM Raman spectrometer. In the Raman spectrum of the artificial graphite measured by a Raman spectrometer, the peak D is at the position of 1300 $cm^{-1}$ to 1400 $cm^{-1}$, and the peak G is at the position of 1580 $cm^{-1}$ to 1620 $cm^{-1}$. $I_D/I_G$ represents the ratio of the peak intensity $I_D$ of the peak D to the peak intensity $I_G$ of the peak G.

In some preferred embodiments, the $I_D/I_G$ of the artificial graphite is ≤0.25. For example, the $I_D/I_G$ of the artificial graphite can be ≤0.23, ≤0.2, ≤0.18, ≤0.16, or ≤0.15. The artificial graphite of the present application has a small $I_D/I_G$, and it can be considered that its surface stability is high, which can further reduce the volume expansion of the secondary battery during the cycle. Further, the $I_D/I_G$ of the artificial graphite can be ≥0.05, ≥0.08, ≥0.1, or ≥0.12. This enables artificial graphite to have higher electrochemical reaction activity and meet the requirements on the kinetic properties of the battery. Preferably, 0.1≤$I_D/I_G$≤0.2.

In some embodiments, the artificial graphite comprises secondary particles formed by aggregation of primary particles. This can make the artificial graphite itself have a lower degree of orientation, which can reduce the cyclic expansion of the battery.

Figure 6A:
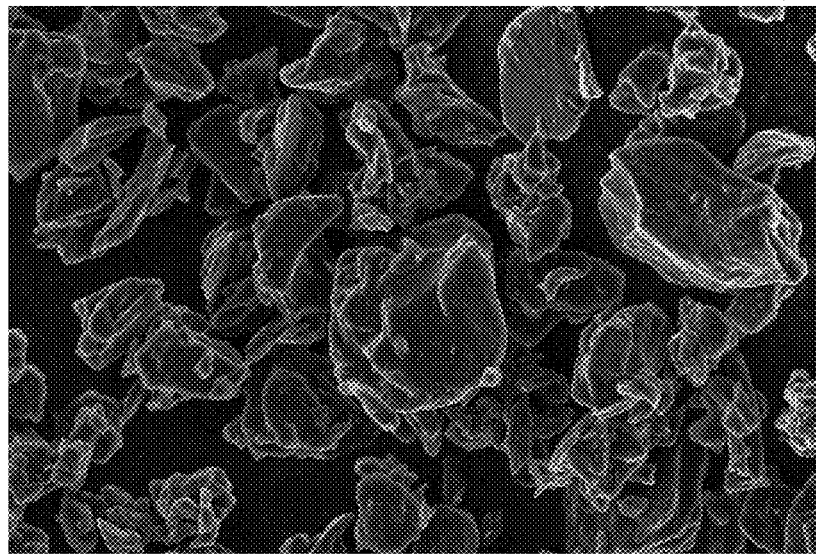
FIGS. 6a-6c are SEM (scanning electron microscope) images of the artificial graphite provided by an embodiment of the present application.
Figures 6B, 6C:
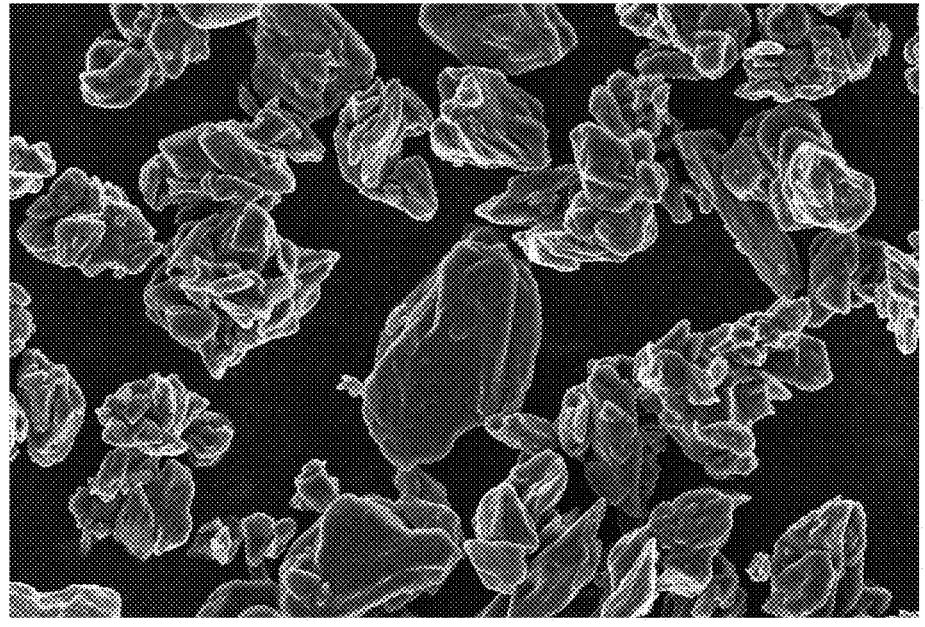

In some embodiments, the morphology of the secondary particles may be one or more of a block shape, a spherical shape, and a spheroid shape. The spheroid shape is, for example, ellipsoid, ellipsoidal, or substantially spherical structure. FIGS. 6a-6c are SEM images showing morphology of artificial graphite as an example.

In some preferred embodiments, the proportion of secondary particles in the artificial graphite is ≥60%, ≥65%, ≥70%, ≥75%, or ≥80%. The OI value of the negative electrode plate using such artificial graphite is small, so the cyclic expansion of the negative electrode plate and the battery can be reduced. Further, the proportion of the number of the secondary particles in the artificial graphite is at most 95%, at most 90%, or at most 85%. The artificial graphite contains a proper amount of primary particles, which can increase the tap density and powder compaction density. Preferably, the proportion of secondary particles in the artificial graphite is from 70% to 90%.

In some preferred embodiments, the gram capacity of the artificial graphite of the present application is from 350 mAh/g to 359 mAh/g, for example, from 350 mAh/g to 357 mAh/g, and for example, from 352 mAh/g to 355 mAh/g. The artificial graphite of the present application has both high gram capacity and high structural stability. Thus it is not easy to disintegrate during the rolling process for preparing the negative electrode plate, so that the cohesion between the particles in the electrode plate is relatively high, thereby reducing the cyclic expansion of the electrode plates and the battery.

In some embodiments, the negative active material optionally further comprises other negative active materials that can be used in the negative electrode of a secondary battery. As an example, other negative active materials may be one or more of other graphite materials (such as other artificial graphite and natural graphite), mesophase carbon microspheres (MCMB in short), hard carbon, soft carbon, silicon-based materials, and tin-based materials.

In some embodiments, the negative electrode film further comprises a binder. As an example, the binder may comprise one or more of polyacrylic acid (PAA), sodium polyacrylate (PAAS), polyacrylamide (PAM), polyvinyl alcohol (PVA), styrene butadiene rubber (SBR), sodium alginate (SA), polymethacrylic acid (PMAA), and carboxymethyl chitosan (CMCS).

In some embodiments, the negative electrode film optionally further comprises a thickener. As an example, the thickener may be sodium carboxymethyl cellulose (CMC-Na).

In some embodiments, the negative electrode film optionally further comprises a conductive agent. As an example, the conductive agent used for the negative electrode film can be one or more selected from graphite, superconducting carbon, acetylene black, carbon black, Ketjen black, carbon dots, carbon nanotubes, graphene, and carbon nanofibers.

In the present application, the $D_n10$, $D_v10$, $D_v50$, and $D_v90$ of the artificial graphite can be measured with a laser particle size analyzer (such as Malvern Master Size 3000) with reference to the standard GB/T 19077.1-2016.

Among them, the physical definitions of $D_n10$, $D_v10$, $D_v50$, and $D_v90$ are as follows:

$D_n10$: the particle size when the cumulative number distribution percentage of the artificial graphite reaches 10%;

$D_v10$: the particle size when the cumulative volume distribution percentage of the artificial graphite reaches 10%;

$D_v50$: the particle size when the cumulative volume distribution percentage of the artificial graphite reaches 50%;

$D_v90$: the particle size when the cumulative volume distribution percentage of the artificial graphite reaches 90%.

The specific surface area SSA of the artificial graphite can be measured using a method known in the art. For example, according to GB/T 19587-2017 (Determination of the specific surface area of solids by gas adsorption using the BET method), analysis of the specific surface area by the nitrogen adsorption can be used, and the specific surface area can be calculated by the BET (Brunauer Emmett Teller) method, in which the analysis of the specific surface area by the nitrogen adsorption can be carried out by a specific surface and pore size distribution analyzer (Type: Tri Star II 3020) from Micromeritics, USA.

In the OI value test of the negative electrode plate, X-ray diffraction analysis can refer to the standard JISK 0131-1996, and use an X-ray diffractometer (such as Bruker D8 Discover X-ray diffractometer) for testing. In the X-ray diffraction analysis test, a copper target can be used as an anode target, a Ni filter with a thickness of 0.02 mm is used to filter $CuK\beta$, and $CuK\alpha$ rays are used as the radiation source, the ray wavelength is $\lambda=1.5418$ Å (taking the weighted average of $K\alpha1$ and $K\alpha2$), the scanning angle range for 2θ is from 20° to 80°, and the scanning rate is 4°/min. In the present application, specifically, the method for testing the OI value of the negative electrode plate is as follows: the prepared negative electrode plate was directly placed in an X-ray diffractometer to the peak area $C_{004}$ of the 004 crystal plane diffraction peak and the peak area $C_{110}$ of the 110 crystal plane diffraction peak of the negative active material in the electrode plate by X-ray diffraction analysis, and the OI value of the negative electrode plate was $C_{004}/C_{110}$.

The 2θ angle corresponding to the 004 crystal plane of the artificial graphite is from 53.5° to 55.5° (for example, 54.5°); the 2θ angle corresponding to the 110 crystal plane of artificial graphite is from 76.5° to 78.5° (for example, 77.5°).

The morphology of the artificial graphite can be tested using a method known in the art. For example, the artificial graphite is stuck on the conductive glue, and the morphology of the particles is tested using a scanning electron microscope & energy spectrometer (such as sigma300). The test can refer to JY/T010-1996.

The proportion of the number of the secondary particles in the artificial graphite can be tested by a prescribed method. For example, the artificial graphite is stuck on the conductive glue, and the scanning electron microscope & energy spectrometer (such as sigma300) is used to test the morphology of the particles. The test can refer to JY/TO10-1996. The magnification is 500 times, and the number of secondary particles and the total number of particles are counted. The proportion of secondary particles is the ratio of the number of secondary particles to the total number of the particles.

The tap density of the artificial graphite can be measured using a method known in the art. For example, refer to the standard GB/T 5162-2006 and use a powder tap density tester (such as Bettersize BT-301, Dandong, China) to test.

The powder compaction density of the artificial graphite can be tested by a method known in the art. For example, refer to GB/T 24533-2009 and use an electronic pressure testing machine (such as UTM7305) to test: put a certain amount of powder on a special compaction mold, set different pressures, and read the thickness of the powder under different pressures on the equipment, and calculate the compaction density under different pressures.

The graphitization degree of the artificial graphite can be measured with a well-known method in the art. For example, the graphitization degree of the artificial graphite can be measured using an X-ray diffractometer (Bruker D8 Discover). The test can refer to JIS K 0131-1996, JB/T 4220-2011: measuring the size of $d_{002}$, and then calculating the graphitization degree according to the formula $G=(0.344-d_{002})/(0.344-0.3354)$, in which $d_{002}$ is the interlayer spacing in the artificial graphite crystal structure, in nm.

[Positive Electrode Plate]

The positive electrode plate comprises a positive electrode current collector and a positive electrode film which is disposed on at least one surface of the positive electrode current collector and comprises a positive active material. As an example, the positive electrode current collector has two opposite surfaces in its own thickness direction, and the positive electrode film is laminated on either or both of the two opposite surfaces of the positive electrode current collector.

The positive electrode current collector can be made of materials with good electrical conductivity and mechanical strength. In some embodiments, the positive electrode current collector may be an aluminum foil.

The present application does not specifically limit the specific types of positive active materials, and materials known in the art for the positive electrode of secondary battery can be used, and those skilled in the art can make selections according to actual needs.

In some embodiments, the secondary battery can be a lithium-ion secondary battery. The positive active material may be selected from lithium transition metal oxides and modified materials thereof, and the modified material may be lithium transition metal oxide subjected to doping modification and/or coating modification. For example, the lithium transition metal oxide can be one or more selected from lithium cobalt oxide, lithium nickel oxide, lithium manganese oxide, lithium nickel manganese oxide, lithium nickel cobalt manganese oxide, lithium nickel cobalt aluminum oxide and lithium containing phosphate with olivine structure.

For example, the positive active material of the secondary battery can be one or more selected from $LiCoO_2$, $LiNiO_2$, $LiMnO_2$, $LiMn_2O_4$, $LiNi_{1/3}Co_{1/3}Mn_{1/3}O_2$(NCM333), $LiNi_{0.5}Co_{0.2}Mn_{0.3}O_2$(NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$(LFP) and $LiMnPO_4$.

In some embodiments, the positive electrode film optionally further comprises a binder. The types of the binder are not specifically limited, and those skilled in the art can make selections according to actual needs. For example, the binder used for the positive electrode film may comprise one or more of polyvinylidene fluoride (PVDF) and polytetrafluoroethylene (PTFE).

In some embodiments, the positive electrode film optionally further comprises a conductive agent. The types of the conductive agent are not specifically limited, and those skilled in the art can make selections according to actual needs. For example, the conductive agent used for the positive electrode film may comprise one or more of graphite, superconducting carbon, acetylene black, carbon black, Ketjen black, carbon dots, carbon nanotubes, graphene, and carbon nanofibers.

[Electrolyte]

The electrolyte conducts ions between the positive electrode plate and the negative electrode plate. There is no specific limitation on the type of electrolyte in the present application, and it can be selected according to the requirement. For example, the electrolyte may be selected from at least one of solid electrolyte and liquid electrolyte (i.e., electrolytic solution).

In some embodiments, an electrolytic solution is used as the electrolyte. The electrolytic solution comprises an electrolyte salt and a solvent.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate), and LiTFOP (lithium tetrafluorooxalate phosphate).

In some embodiments, the solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE).

In some embodiments, the electrolytic solution may optionally comprise an additive. For example, the additives may comprise negative electrode film-forming additives, positive electrode film-forming additives, and additives that can improve certain performance of the battery, such as additives that improve overcharge performance of the battery, additives that improve high-temperature performance of the battery, and those that improve low-temperature performance of the battery.

[Separator]

In the secondary batteries that use an electrolytic solution, and some secondary batteries that use solid electrolytes, a separator is also included. The separator is located between the positive electrode plate and the negative electrode plate to play a role of isolation. The separator is not particularly limited, and any well-known porous structure separator having electrochemical stability and mechanical stability can be selected. In some embodiments, the separator can be one or more of glass fiber, non-woven fabric, polyethylene, polypropylene, and polyvinylidene fluoride. The separator can be a single-layer film or a multilayer film. When the separator is a multilayer film, the materials of each layer may be the same or different.

[Outer Packaging]

In some embodiments, the secondary battery may comprise an outer packaging which is used to encapsulate the positive electrode plate, the negative electrode plate and the electrolyte. As an example, the positive electrode plate, negative electrode plate and the separator can be laminated or wound to form a battery core with a laminated structure or a battery core with a wound structure, then the battery core is encapsulated in an outer packaging; the electrolyte can be an electrolytic solution, which is used to infiltrate the battery core. The number of battery cores in the secondary battery can be one or more, which can be adjusted according to requirements.

In some embodiments, the outer packaging of the secondary battery may be a soft bag, such as a bag-type soft bag. The material of the soft bag can be plastic, such as one or more of polypropylene (PP), polybutylene terephthalate (PBT), and polybutylene succinate (PBS). The outer packaging of the secondary battery may also be a hard case, such as a hard plastic case, an aluminum case, or a steel case.

[Preparation]

The preparation of the secondary battery may comprise the step of assembling the negative electrode plate, the positive electrode plate, and the electrolyte to form a secondary battery. In some embodiments, the positive electrode plate, the separator, and the negative electrode plate can be wound or laminated in order, so that the separator is located between the positive electrode plate and the negative electrode plate to play a role of isolation, as such to obtain a battery core; the battery core is placed in an outer packaging, and then an electrolyte is injected and sealed to obtain a secondary battery.

In some embodiments, the preparation of the secondary battery may further comprises the step of preparing a positive electrode plate. As an example, a positive active material, a conductive agent, and a binder can be dispersed in a solvent (such as N-methylpyrrolidone, NMP for short) to form a uniform positive electrode slurry; the positive electrode slurry is coated on a positive electrode current collector; after being dried, cold pressed and other processes, the positive electrode plate is obtained.

In some embodiments, the preparation of the secondary battery comprises the step of using any one or more of the artificial graphite of the present application to prepare a negative electrode plate.

In some embodiments, the step of using any one or more of the artificial graphite of the present application to prepare a negative electrode plate may comprise: dispersing the negative active material comprising any one or more of the artificial graphite of the present application, a binder, and an optional thickeners and a conductive agent in a solvent which can be deionized water to form a uniform negative electrode slurry; the negative electrode slurry is coated on the negative electrode current collector, and after the steps of drying and cold pressing, a negative electrode plate is obtained.

Next, the present application also provides a method for preparing the artificial graphite, by which any artificial graphite of the present application can be prepared.

The method for preparing artificial graphite provided by the embodiment of the application includes the following steps:

S10: crushing the green coke materials and classifying them;

S20: shaping the product obtained in step S10;

S30: granulating the product obtained in step S20;

S40: performing graphitization treatment on the product obtained in step S30 to obtain the artificial graphite.

Regarding the above preparation method, in step S10, the green coke material may be selected from one or more of green petroleum coke, green pitch coke and metallurgical coke, and preferably comprises green petroleum coke.

Preferably, the green coke is non-needle coke. Preferably, the non-needle coke comprises one or more of non-needle green petroleum coke, non-needle green pitch coke and non-needle metallurgical coke; more preferably, the non-needle coke comprises non-needle green petroleum coke.

In some embodiments, in step S10, preferably, the volatile content of the green coke is 6%-12% (weight percentage). For example, the volatile content of the green coke powder can be 6% or more, 6.5% or more, 7% or more, or 7.5% or more; and can be 12% or less, 11% or less, 10% or less, or 9% or less. Preferably, the volatile content of the green coke is from 7% to 10%.

The volatile content of the green coke is appropriate, which can make it have higher self-adhesion in the granulation process of step S20, improve the bonding strength between the primary particles in the artificial graphite, and make the artificial graphite have a higher structure strength. At the same time, the green coke raw material is also conducive to forming a dense structure of artificial graphite, and further improving the structural strength of artificial graphite.

The volatile content of the green coke can be tested using a method known in the art. For example, refer to SH/T 0026-1990.

In some embodiments, the sulfur content of the green coke may be 2% or less, 1.5% or less, 1% or less, or 0.6% or less. The green coke has a low sulfur content, which can reduce the probability that the specific surface area of artificial graphite will increase due to the escape of more sulfur components in the subsequent process. This is beneficial to making the specific surface area of artificial graphite meet the aforementioned requirements. Preferably, the sulfur content of the green coke is 0.6% or less.

The sulfur content of green coke can be tested by a method known in the art, for example, with reference to GB/T 2286-2008.

In step S10, equipment and method known in the art can be used to crush the green coke material, such as jet mill, mechanical mill or roller mill. The crushing process often produces a lot of too small particles, sometimes there are too large particles, so after crushing, it can be classified according to the requirements to remove the too small particles and the too large particles in the powder after crushing. After the classification treatment, a granular product with a better particle size distribution can be obtained, which is convenient for the subsequent shaping and granulation process. The classification treatment can be carried out by using equipment and a method known in the art, such as a classification screen, a gravity classifier, a centrifugal classifier, and the like.

By adjusting the particle size distribution of the granular product obtained in step S10, such as $D_v10$, $D_v50$ and/or $D_v90$ within an appropriate range, the degree of granulation in the subsequent granulation step can be improved, and the artificial graphite itself can have a higher degree of isotropy and also have a higher gram capacity.

In step S20, the edges and corners of the granular product obtained in step S10 are polished by shaping. This facilitates the subsequent granulation process and makes the secondary particles of the obtained artificial graphite have higher stability.

In step S20, equipment and a method known in the art may be used to perform shaping treatment on the granular product obtained in step S10, such as a shaping machine or other shaping equipment.

In some embodiments, step 20 further includes removing fine powder after shaping. Through the fine powder removal treatment after shaping, the $D_n10$ of the shaped particle product can be adjusted to be in an appropriate range, so that the $D_n10$ of the obtained artificial graphite is within the required range. In some embodiments, in step 20 the $D_n10$ of the obtained particles is controlled to be ≥0.5 μm, preferably from 0.5 μm to 1.5 μm.

Equipment and a method known in the art can be used to remove fine powder, such as a grading screen, a gravity classifier, a centrifugal classifier, and the like.

In step S30, the granular product obtained in step S20 is granulated, so that the independently dispersed primary particles are aggregated to form secondary particles, which can significantly increase the isotropy of artificial graphite, thereby reducing the OI value of the negative electrode plate. The amount of binder added during the granulation process does not exceed 5% of the total weight of the green coke material (i.e. the amount of the binder is less than or equal to 5% of the total weight of the green coke material); preferably, the granulation process is performed without adding a binder (i.e. the amount of the binder is 0% of the total weight of the green coke material). For example, when the volatile content of the green coke material is at least 7%, the step S30 can granulate the granular product obtained in step 20 without adding a binder.

Granulation with reduced or no binder can further increase the gram capacity of artificial graphite. In particular, using the self-adhesive properties of the green coke to granulate it under the condition of reduced or no binder can increase the overall structural strength of the artificial graphite particles, thereby further reducing the cyclic expansion of the battery. However, the content of volatile matter should not be excessively large, otherwise it will significantly reduce the gram capacity of the negative active material and affect its processing performance during subsequent use.

In step S30, equipment known in the art may be used for granulation, such as a granulator. The granulator usually includes a stirred reactor and a module for temperature control of the reactor. By adjusting the stirring speed, heating rate, granulation temperature, cooling rate, etc. in the granulation process, it is beneficial to improve the structural strength and isotropy of the obtained artificial graphite, so that the $C_{004}/C_{110}$ of the artificial graphite can meet the demand.

Furthermore, by adjusting the above process conditions, the volume average particle size $D_v50$ of the granulated product can be within the required range, or the $D_v10$, $D_v50$, and $D_v90$ of the granulated product can all be within the required range.

By adjusting the particle size distribution of step S10 and/or S30, the $D_v50$, $D_v10$, $D_v90$ and/or $(D_v90-D_v10)/D_v50$ of the artificial graphite finally prepared can be within the required range.

In step S40, the granulated product obtained in step S30 is graphitized to obtain an artificial graphite with a suitable graphitization degree. In some embodiments, the temperature for graphitization in step S40 may be from 2800° C. to 3200° C., preferably from 2900° C. to 3100° C. The artificial graphite prepared at an appropriate graphitization temperature can obtain an appropriate degree of graphitization, so that the artificial graphite can obtain higher structural stability and gram capacity.

In step S40, graphitization can be performed using equipment known in the art, such as a graphitization furnace, and further, for example, an Acheson graphitization furnace. After the graphitization process is completed, a small amount of oversized particles formed by agglomeration of the granulated product during the high-temperature graphitization process can be removed by sieving. This can prevent oversized particles from affecting material processing properties, such as stability and coating properties of the slurry.

In some embodiments, step S50 may be further included after step S40: mixing the artificial graphite obtained in step S40 with an organic carbon source, and then heat-treating at a temperature of 850° C. to 1250° C. to obtain artificial graphite having an amorphous carbon coating layer. The organic carbon source can be selected from one or more of phenolic resin, asphalt, furfural resin, and epoxy resin, preferably asphalt.

The present application does not particularly limit the shape of the secondary battery, which can be cylindrical, square or other arbitrary shapes. FIG. 1 shows a secondary battery 5 with a square structure as an example.

In some embodiments, the secondary battery can be assembled into a battery module, and the number of secondary batteries contained in the battery module can be multiple, and the specific number can be adjusted according to the application and capacity of the battery module.

Figure 2:
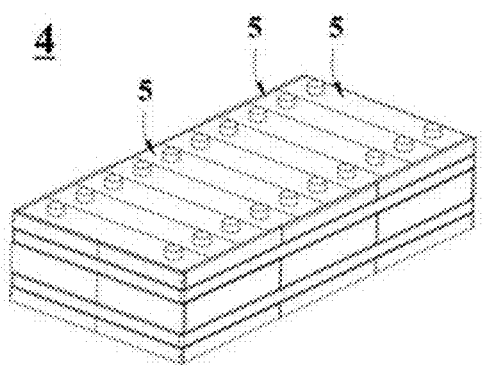
FIG. 2 is a schematic diagram of a battery module provided by an embodiment of the present application.

FIG. 2 shows a battery module 4 as an example. Referring to FIG. 2, in the battery module 4, a plurality of secondary batteries 5 may be disposed sequentially in the length direction of the battery module 4. Of course, the secondary batteries 5 may also be disposed in any other manner. Furthermore, the plurality of secondary batteries 5 may be fixed by fasteners.

Optionally, the battery module 4 may further comprise a housing with a receiving space, and the plurality of secondary batteries 5 are received in the receiving space.

In some embodiments, the above-mentioned battery module may also be assembled into a battery pack, and the number of battery modules contained in the battery pack can be adjusted according to the application and capacity of the battery pack.

Figure 3:
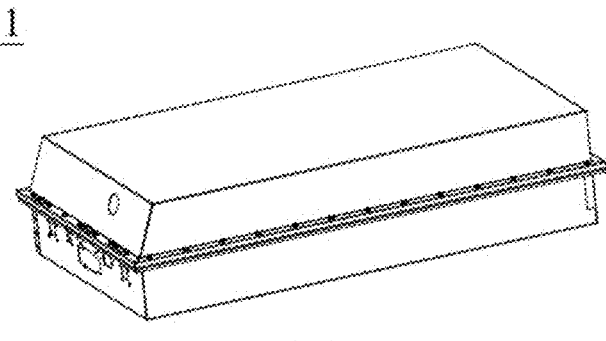
FIG. 3 is a schematic diagram of a battery pack provided by an embodiment of the present application.
Figure 4:
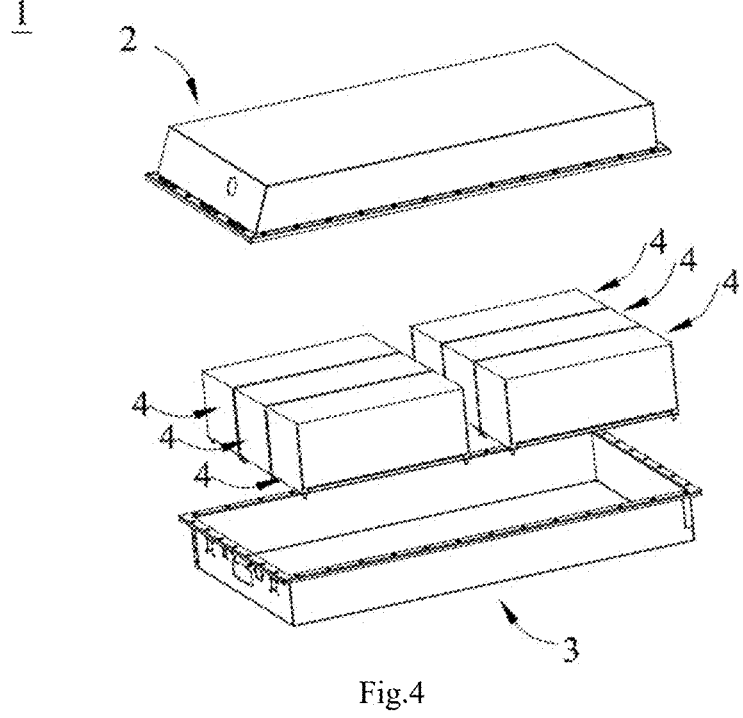
FIG. 4 is an exploded view of FIG. 3.

FIGS. 3 and 4 show a battery pack 1 as an example. Referring to FIGS. 3 and 4, the battery pack 1 may comprise a battery case and a plurality of battery modules 4 disposed in the battery case. The battery case comprises an upper case body 2 and a lower case body 3.

The upper case body 2 can cover the lower case body 3 to form a closed space for receiving the battery modules 4. A plurality of battery modules 4 can be disposed in the battery case in any manner.

[Apparatus]

The second aspect of the present application provides an apparatus, comprising the secondary battery according to the first aspect of the present application, and the secondary battery provides power to the apparatus. The apparatus may be, but is not limited to, a mobile apparatus (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The apparatus may comprise the secondary battery, the battery module or the battery pack selected according to its usage requirements.

Figure 5:
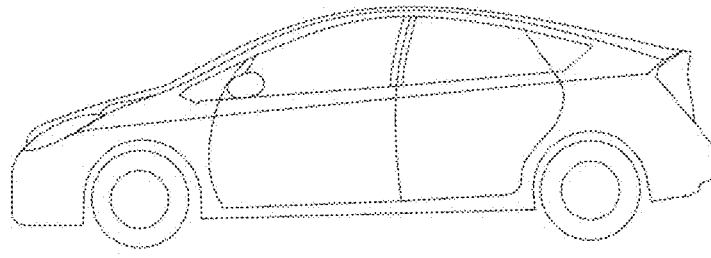
FIG. 5 is a schematic diagram of an apparatus provided by an embodiment of the present application.

FIG. 5 shows an apparatus as an example. The apparatus is a pure electric vehicle, a hybrid electric vehicle, or a plug-in hybrid electric vehicle. In order to meet the requirements of the apparatus for high power and high energy density of secondary batteries, the battery pack or battery module can be used.

As another example, the apparatus may be a mobile phone, a tablet computer, a notebook computer, etc. The apparatus is generally required to be thin and light, and the secondary battery can be used as a power supply.

EXAMPLES

In order to describe the technical contents, structural features, achieved objectives and effects of the technical solutions in detail, the following detailed descriptions will be given in conjunction with specific embodiments. It should be understood that these embodiments are only used for explaining the present application, rather than limiting the scope of the present application. Unless otherwise stated, all parts, percentages, and ratios described in the following embodiments are based on weight, all reagents used in the embodiments are commercially available or synthesized according to conventional methods and can be directly used without further treatment, and all instruments used in the embodiments are commercially available.

Test Section (1) Gram Capacity of the Artificial Graphite

The prepared artificial graphite, SuperP as a conductive agent, PVDF as a binder and NMP (N-methylpyrrolidone) as a solvent were mixed uniformly at a mass ratio of 91.6:1.8:6.6 to form a slurry; the slurry was coated on a copper foil current collector, dried in an oven for later use. A lithium metal sheet was used as the counter electrode; polyethylene (PE) film was used as the separator; and ethylene carbonate (EC), ethyl methyl carbonate (EMC), and diethyl carbonate (DEC) were mixed in a volume ratio of 1:1:1, and then $LiPF_6$ was uniformly dissolve in the above solution to obtain an electrolyte, in which the concentration of $LiPF_6$ was 1 mol/L; the above parts were assembled into CR2430-typde button battery in a glove box protected by argon.

After standing for 12 hours, the button battery was discharged at a constant current of 0.05 C to 0.005V, standing for 10 minutes, and then was discharged at a constant current of 50 μA to 0.005V, standing for 10 minutes, then was discharged at a constant current of 10 μA current to 0.005V; then the battery was charged at a constant current of 0.1 C to 2V, and the charge capacity was recorded at this time. The ratio of the charge capacity to the mass of the artificial graphite was the gram capacity of the prepared artificial graphite.

(2) Cyclic Expansion Rate of Negative Electrode Plate

The thickness of the negative electrode plate after cold pressing was recorded as $H_0$. The cold-pressed negative electrode plate, positive electrode plate, separator, and electrolyte were made into a secondary battery. At 25° C., the secondary battery was subjected to a 100% DOD (100% depth of discharge, that is to say, fully charged and then fully discharged) 1 C/1 C cycle in the NEWARE charge and discharge machine. The discharge capacity of the first cycle (i.e. the initial capacity) was recorded as 100%. When the cycle capacity retention rate was 80% of the initial capacity, the cycle stopped. Then the secondary battery was charged to 100% SOC (State of Charge), and disassembled, and then the thickness of the corresponding negative electrode plate was measured and denoted as $H_1$. The cyclic expansion rate of the negative electrode plate was: $(H_1/H_0-1) \times 100\%$.

(3) Kinetic Performance of the Battery

At 25° C., the batteries prepared in the Examples and Comparative examples were fully charged at x C and fully discharged at 1 C for 10 times, then the batteries were fully charged at x C, and then the negative electrode plate was disassembled and the lithium precipitation on the surface of the electrode plate was observed. If no lithium was precipitated on the surface of the negative electrode, the battery was tested with the charge rate x C in increments of 0.1 C until lithium was precipitated on the surface of the negative electrode, and then the test was stopped. At this time, the charge rate (x−0.1) C was the maximum charge rate of the battery.

(4) Energy Density Test of Secondary Battery

At 25° C., the secondary batteries prepared in the Examples and Comparative examples were subjected to charge and discharge test at 1/3 C-1/3 C (the testing instrument can be a NEWARE tester), and the voltage range was from 2.8V to 4.3V. The energy released by the battery in the first cycle was recorded and divided by the weight of the battery to get the weight energy density of the battery, in Wh/kg.

Example 1

Preparation of Artificial Graphite

1) Crushing the raw material: the raw material (non-needle green petroleum coke) was crushed by using a mechanical mill or roller mill. The non-needle green petroleum coke had a volatile content of 12% and a sulfur content of 0.6%. After crushing, classification treatment was carried out to control the particle size distribution of the obtained granular product.

2) Shaping: shaping the granular product obtained after crushing.

3) Granulating: the granular product obtained after shaping was put into the reactor of the granulator, and the green coke powder was granulated without adding a binder.

4) Graphitization: the granulated product was added into a graphitization furnace, and heated up to 3000° C. for ultra-high temperature graphitization to obtain artificial graphite.

Preparation of Negative Electrode Plate

The artificial graphite prepared above, a conductive agent (Super P), a binder (styrene butadiene rubber emulsion), and a thickener (CMC-Na) were fully stirred and mixed at a mass ratio of 96.2:0.8:1.8:1.2 in an appropriate amount of deionized water to form a uniform negative electrode slurry; the negative electrode slurry was coated on the surface of the negative electrode current collector copper foil, dried and cold pressed to obtain a negative electrode plate. The compaction density of the negative electrode plate was 1.65 g/cm³, and the areal density was 10.7 mg/cm².

Preparation of Positive Electrode Plate

The positive active material lithium nickel cobalt manganese oxide ($LiNi_{0.5}Co_{0.2}Mn_{0.3}O_2$) (NCM523), the conductive agent (Super P), and the binder (PVDF) were fully stirred and mixed at a weight ratio of 96.2:2.7:1.1 in an appropriate amount of NMP to form a uniform positive electrode slurry; the positive electrode slurry was coated on the surface of the positive electrode current collector aluminum foil, dried and cold pressed to obtain a positive electrode plate. The compaction density of the positive electrode plate was 3.45 g/cm³, and the areal density was 18.8 mg/cm².

Preparation of Electrolyte

Ethylene carbonate (EC), ethyl methyl carbonate (EMC), and diethyl carbonate (DEC) were mixed at a volume ratio of 1:1:1, and then $LiPF_6$ was uniformly dissolved in the above solution to obtain an electrolyte, in which the concentration of $LiPF_6$ was 1 mol/L.

Separator

Polyethylene (PE) film was used as a separator.

Preparation of Secondary Battery

The positive electrode plate, the separator, and the negative electrode plate were stacked in order, and a battery core was obtained after winding; then the battery core was put into the outer packaging, and the above-mentioned electrolyte was added, and after encapsulation, standing, formation, and aging, a secondary battery was obtained. The outer packaging was a hard case with length*width*height=148 mm*28.5 mm*97.5 mm.

Examples 2-10

The preparation method was similar to Example 1 with the exception that the preparation parameters of the artificial graphite were adjusted to obtain artificial graphite having different $D_v50 \times SSA$ and OI values.

Comparative Examples 1-5

The preparation method was similar to Example 1 with the exception that the preparation parameters of the artificial graphite were adjusted to obtain artificial graphite having different $D_v50 \times SSA$ and OI values. In addition, the raw materials of Comparative Examples 1 to 4 were calcined needle-like petroleum coke (i.e., calcined needle petroleum coke), and the granulation step 3) of Comparative Example 2 was omitted; an asphalt was added in the granulation step 3) of Comparative Examples 1 and 3 as the binder, wherein the amount of asphalt was present in an amount of 8%, based on the total weight of the raw materials; for Comparative Example 4, after the graphitization step 4), it further included the step of coating the artificial graphite with an asphalt and carbonizing it at 1050° C. in a protective atmosphere.

TABLE 1

| | | Preparation parameters of the artificial graphite in Examples 1~10 and Comparative Examples 1~5 | | | |
| --- | --- | --- | --- | --- | --- |
| | Types of raw materials | Volatile content [wt %] | Sulfur content [wt %] | Graphitization temperature [° C.] | Morphology of artificial graphite |
| Example 1 | Non-needle green petroleum coke | 12.0 | 0.6 | 3000 | Amount of secondary particles ≥ 87% |
| Example 2 | Non-needle green petroleum coke | 11.0 | 0.4 | 3100 | Amount of secondary particles ≥ 85% |
| Example 3 | Non-needle green petroleum coke | 9.8 | 0.5 | 3100 | Amount of secondary particles ≥ 80% |
| Example 4 | Non-needle green petroleum coke | 8.5 | 1.4 | 3100 | Amount of secondary particles ≥ 78% |
| Example 5 | Non-needle green petroleum coke | 8.4 | 1.1 | 3100 | Amount of secondary particles ≥ 70% |
| Example 6 | Non-needle green petroleum coke | 9.8 | 0.5 | 3100 | Amount of secondary particles ≥ 86% |
| Example 7 | Non-needle green petroleum coke | 9.8 | 0.5 | 3100 | Amount of secondary particles ≥ 85% |
| Example 8 | Non-needle green petroleum coke | 9.8 | 0.5 | 3100 | Amount of secondary particles ≥ 81% |
| Example 9 | Non-needle green petroleum coke | 9.8 | 0.5 | 3100 | Amount of secondary particles ≥ 76% |

TABLE 1-continued

Preparation parameters of the artificial graphite in Examples 1~10 and
Comparative Examples 1~5

| | Types of raw materials | Volatile content [wt %] | Sulfur content [wt %] | Graphitization temperature [° C.] | Morphology of artificial graphite |
|---|---|---|---|---|---|
| Example 10 | Non-needle green petroleum coke | 9.8 | 0.5 | 3100 | Amount of secondary particles ≥ 71% |
| Comparative Example 1 | Needle-like cooked petroleum coke | 3.0 | 0.5 | 3100 | Amount of secondary particles ≥ 56% |
| Comparative Example 2 | Needle-like cooked petroleum coke | 3.0 | 0.5 | 3000 | Amount of primary particles ≥ 90% |
| Comparative Example 3 | Needle-like cooked petroleum coke | 3.0 | 0.5 | 3000 | Amount of secondary particles ≥ 76% |
| Comparative Example 4 | Needle-like cooked petroleum coke | 12.0 | 2.0 | 3100 | Amount of secondary particles ≥ 71% |
| Comparative Example 5 | Non-needle green petroleum coke | 9.8 | 1.5 | 3100 | Amount of secondary particles ≥ 76% |

TABLE 2

Test results (parameters) of Examples 1~10 and Comparative Examples 1~5

| | $D_v50$ [μm] | SSA | Y | OI | $D_n10$ [μm] | $D_v10$ [μm] | Particle size span |
|---|---|---|---|---|---|---|---|
| Example 1 | 18.0 | 1.02 | 18.4 | 6.1 | 0.90 | 9.5 | 1.36 |
| Example 2 | 17.5 | 0.98 | 17.2 | 8.3 | 0.89 | 8.9 | 1.32 |
| Example 3 | 16.8 | 1.11 | 18.6 | 11.2 | 0.87 | 7.8 | 1.35 |
| Example 4 | 16.2 | 1.15 | 18.6 | 12.3 | 0.89 | 7.5 | 1.39 |
| Example 5 | 15.8 | 1.20 | 19.0 | 15.0 | 0.88 | 7.2 | 1.41 |
| Example 6 | 22.0 | 0.56 | 12.3 | 8.3 | 0.90 | 10.8 | 1.20 |
| Example 7 | 19.4 | 0.72 | 14.0 | 8.5 | 0.89 | 10.2 | 1.26 |
| Example 8 | 18.3 | 0.95 | 17.4 | 9.5 | 0.89 | 9.5 | 1.35 |
| Example 9 | 17.5 | 1.35 | 23.6 | 9.9 | 0.45 | 6.2 | 1.32 |
| Example 10 | 15.4 | 1.60 | 24.6 | 10.2 | 0.43 | 5.6 | 1.50 |
| Comparative Example 1 | 14.3 | 1.30 | 18.6 | 22.4 | 1.30 | 6.0 | 1.69 |
| Comparative Example 2 | 8.7 | 1.70 | 14.8 | 25.3 | 0.65 | 4.0 | 1.44 |
| Comparative Example 3 | 25.0 | 0.50 | 12.5 | 21.0 | 1.40 | 10.2 | 1.21 |
| Comparative Example 4 | 13.5 | 0.85 | 11.5 | 12.0 | 3.40 | 6.5 | 1.59 |
| Comparative Example 5 | 14.2 | 1.65 | 23.4 | 14.5 | 0.43 | 5.8 | 1.65 |

In Table 2 and the following table: Y=D50×SSA; Particle size span=($D_v90 - D_v10$)/$D_v50$.

Other parameters of the artificial graphite in Table 2: The graphitization degree of the artificial graphite of Examples 1-10 and Comparative Examples 1-5 was from about 92% to about 93%; the $I_D/I_G$ of the artificial graphite of Examples 1-10 and Comparative Examples 1-3 and 5 was from about 0.16 to about 0.18, and the $I_D/I_G$ of the artificial graphite of Comparative Example 4 was 0.33.1.6 C

TABLE 3

Test results (performance) of Examples 1~10 and Comparative Examples 1~5

| | Cyclic expansion rate of electrode plate [%] | Gram capacity of artificial graphite [mAh/g] | Kinetic performance |
|---|---|---|---|
| Example 1 | 28.6 | 351.2 | 1.5 C |
| Example 2 | 28.9 | 351.1 | 1.5 C |
| Example 3 | 29.1 | 350.8 | 1.5 C |

TABLE 3-continued

Test results (performance) of Examples 1~10 and Comparative Examples 1~5

| | Cyclic expansion rate of electrode plate [%] | Gram capacity of artificial graphite [mAh/g] | Kinetic performance |
|---|---|---|---|
| Example 4 | 29.4 | 350.2 | 1.6 C |
| Example 5 | 29.6 | 350.1 | 1.6 C |
| Example 6 | 28.8 | 352.0 | 1.4 C |
| Example 7 | 29.0 | 351.5 | 1.4 C |
| Example 8 | 28.9 | 351.1 | 1.5 C |
| Example 9 | 29.4 | 350.7 | 1.5 C |
| Example 10 | 29.6 | 348.6 | 1.6 C |
| Comparative Example 1 | 34.6 | 350.8 | 1.4 C |
| Comparative Example 2 | 37.4 | 350.9 | 1.5 C |
| Comparative Example 3 | 36.5 | 350.6 | 1.4 C |

TABLE 3-continued

| Test results (performance) of Examples 1~10 and Comparative Examples 1~5 | | |
| --- | --- | --- |
| Cyclic expansion rate of electrode plate [%] | Gram capacity of artificial graphite [mAh/g] | Kinetic performance |
| Comparative Example 4 | 36.1 | 347.3 | 1.7 C |
| Comparative Example 5 | 35.3 | 346.4 | 1.6 C |

From the comparison of Examples 1-10 and Comparative Examples 1-5, it can be seen that, regarding the negative electrode plate of the secondary battery comprised the negative active material, the negative active material comprising artificial graphite, the $D_v 50$ of the artificial graphite was in an appropriate range, and the $D_v 50$ and SSA of the artificial graphite satisfied an appropriate relationship, and when the compaction density was from 1.6 g/cm³ to 1.75 g/cm³ the OI value of the negative electrode plate was within an appropriate range, the cyclic expansion of the battery was effectively reduced, without affecting the gram capacity of artificial graphite.

In Comparative Example 1, the artificial graphite had a high OI value and poor isotropy, and its expansion cannot be dispersed in all directions during the lithium intercalation process, resulting in a large cyclic expansion rate of electrode plate.

In Comparative Examples 2 and 3, the $D_v 50 \times SSA$ of the artificial graphite was appropriate, but the $D_v 50$ was larger or smaller, resulting in a higher OI value of the negative electrode plate, thus the negative electrode plate using such artificial graphite had a larger cyclic expansion rate. Moreover, in Comparative Example 2, due to the small $D_v 50$ of the artificial graphite, it was difficult to obtain a higher compaction density of electrode plate.

In Comparative Examples 4 and 5, the $D_v 50$ of the artificial graphite and the OI value of the negative electrode plate were in the appropriate range, but the $D_v 50 \times SSA$ value was smaller or larger, resulting in the cyclic expansion rate of the negative electrode plate to be larger, which also affected the gram capacity. Moreover, it was difficult to obtain a higher compaction density of electrode plate by using the coated artificial graphite of Comparative Example 4.

Examples 11-15 and Comparative Examples 6-7

The preparation method was similar to Example 4 with the exception that the compaction density of the negative electrode plate was adjusted.

TABLE 4

| | | | | | | | | |
| --- | --- | --- | --- | --- | --- | --- | --- | --- |
| Test results (parameters) of Examples 11~15 and Comparative Examples 6~7 | | | | | | | | |
| | $D_v 50$ [μm] | SSA | Y | OI | Compaction density of electrode plate [g/cm³] | $D_n 10$ [μm] | $D_v 10$ [μm] | Particle size span |
| Example 11 | 16.2 | 1.15 | 18.6 | 11.8 | 1.6 | 0.89 | 7.5 | 1.39 |
| Example 12 | 16.2 | 1.15 | 18.6 | 12.1 | 1.62 | 0.89 | 7.5 | 1.39 |
| Example 13 | 16.2 | 1.15 | 18.6 | 12.5 | 1.68 | 0.89 | 7.5 | 1.39 |
| Example 14 | 16.2 | 1.15 | 18.6 | 12.8 | 1.7 | 0.89 | 7.5 | 1.39 |
| Example 15 | 16.2 | 1.15 | 18.6 | 13.2 | 1.75 | 0.89 | 7.5 | 1.39 |
| Comparative Example 6 | 16.2 | 1.15 | 18.6 | 10.7 | 1.5 | 0.89 | 7.5 | 1.39 |
| Comparative Example 7 | 16.2 | 1.15 | 18.6 | 13.9 | 1.8 | 0.89 | 7.5 | 1.39 |

TABLE 5

| Test results (performance) of Examples 11~15 and Comparative Examples 6~7 | | | |
| --- | --- | --- | --- |
| | Cyclic expansion rate of electrode plate [%] | energy density of battery [Wh/kg] | Kinetic performance |
| Example 11 | 28.1 | 224.8 | 1.6 C |
| Example 12 | 28.6 | 225.0 | 1.6 C |
| Example 13 | 29.6 | 225.3 | 1.5 C |
| Example 14 | 29.9 | 225.6 | 1.5 C |
| Example 15 | 30.1 | 226.3 | 1.4 C |
| Comparative Example 6 | 27.9 | 223.6 | 1.7 C |
| Comparative Example 7 | 30.8 | 227.1 | 1.3 C |

It can be concluded from Examples 11-15 that when the compaction density of the negative electrode plate was within the given range, the battery can simultaneously have lower cyclic expansion, higher energy density, and better kinetic performance.

The negative electrode plate of Comparative Example 6 had a lower compaction density, and its corresponding battery energy density was lower.

The negative electrode plate of Comparative Example 7 had a higher compaction density, and the battery had a larger cyclic expansion and poor kinetic performance.

Examples 18-24

The preparation method was similar to Example 4 with the exception that step 2) of the method for preparing the artificial graphite further included removing fine powder after shaping to adjust the $D_n 10$ of the artificial graphite.

TABLE 6

| | Test results (parameters) of Examples 18~24 | | | | | | |
|---|---|---|---|---|---|---|---|
| | $D_v50$ [μm] | SSA | Y | OI | $D_n10$ [μm] | $D_v10$ [μm] | Particle size span |
| Example 18 | 15.5 | 1.20 | 18.6 | 10.1 | 1.0 | 6.5 | 1.35 |
| Example 19 | 15.8 | 1.15 | 18.2 | 10.1 | 1.2 | 6.9 | 1.35 |
| Example 20 | 16.2 | 1.12 | 18.1 | 10.2 | 1.3 | 7.2 | 1.37 |
| Example 21 | 16.6 | 1.10 | 18.3 | 10.5 | 1.5 | 7.5 | 1.37 |
| Example 22 | 17.1 | 1.05 | 18.0 | 10.7 | 1.8 | 7.8 | 1.35 |
| Example 23 | 17.6 | 1.01 | 17.8 | 10.7 | 2.0 | 7.8 | 1.36 |
| Example 24 | 18.0 | 0.98 | 17.6 | 10.8 | 2.5 | 7.9 | 1.34 |

Other parameters of the artificial graphite: the graphitization degree of the artificial graphite of Examples 18-24 was from about 9200 to about 930; $I_D/I_G$ was from about 0.16 to about 0.18.

TABLE 7

| | Test results (performance) of Examples 18~24 | |
|---|---|---|
| | Cyclic expansion rate of electrode plate [%] | Gram capacity of artificial graphite [mAh/g] |
| Example 18 | 28.1 | 353.9 |
| Example 19 | 28.1 | 354.1 |
| Example 20 | 28.6 | 354.6 |
| Example 21 | 28.9 | 355.3 |
| Example 22 | 28.4 | 356.2 |

TABLE 7-continued

| | Test results (performance) of Examples 18~24 | |
|---|---|---|
| | Cyclic expansion rate of electrode plate [%] | Gram capacity of artificial graphite [mAh/g] |
| Example 23 | 28.7 | 356.5 |
| Example 24 | 28.6 | 356.7 |

From the comparison of Examples 18-24 and Example 4, it can be seen that when the artificial graphite further had a $D_{11}10$ in an appropriate range, it can improve the cyclic expansion of the electrode plate and the battery while increasing the gram capacity of the artificial graphite.

Examples 25-27

The preparation method was similar to Example 20 with the exception that green cokes with different volatile contents were selected.

TABLE 8

| | Preparation parameters of the artificial graphite in Examples 25~27 | | | | |
|---|---|---|---|---|---|
| | Types of raw materials | Volatile content [wt %] | Sulfur content [wt %] | Graphitization temperature [° C.] | Morphology of artificial graphite |
| Example 25 | Non-needle green petroleum coke | 8.0 | 0.5 | 3100 | Amount of secondary particles ≥ 7 8% |
| Example 26 | Non-needle green petroleum coke | 7.2 | 0.5 | 3100 | Amount of secondary particles ≥ 72% |
| Example 27 | Non-needle green petroleum coke | 6.0 | 0.5 | 3100 | Amount of secondary particles ≥ 64% |

TABLE 9

| | Test results (parameters) of Examples 25~27 | | | | | | |
|---|---|---|---|---|---|---|---|
| | $D_v50$ [μm] | SSA | Y | OI | $D_n10$ [μm] | $D_v10$ [μm] | Particle size span |
| Example 25 | 16.3 | 1.11 | 18.1 | 10.1 | 1.2 | 7.3 | 1.36 |
| Example 26 | 16.5 | 1.09 | 18.0 | 10.2 | 1.2 | 7.5 | 1.35 |
| Example 27 | 16.8 | 1.05 | 17.6 | 10.8 | 1.3 | 7.6 | 1.33 |

Other parameters of the artificial graphite: the graphitization degree of the artificial graphite of Examples 25-27 was from about 92% to about 93%; $I_D/I_G$ was from about 0.16 to about 0.18.

TABLE 10

| Test results (performance) of Examples 25~27 | | |
| --- | --- | --- |
| | Cyclic expansion rate of electrode plate [%] | Gram capacity of artificial graphite [mAh/g] |
| Example 25 | 28.1 | 355.3 |
| Example 26 | 28.2 | 354.9 |
| Example 27 | 29.0 | 354.2 |

From the results of Example 25-27 and Example 20, it can be seen that the appropriate volatile content can improve the structural stability of artificial graphite, and further reduce the cyclic expansion of the electrode plate and battery; at the same time, it can also make the artificial graphite have a relatively high gram capacity.

The above mentioned descriptions only show particular implementations of the present application and but are not intended to limit the protection scope of the present application. Any modification or replacement readily figured out by a person skilled in the art within the technical scope disclosed in the present application shall fall within the protection scope of the present application. Therefore, the protection scope of the present application shall be determined by the protection scope of the claims.

What is claimed is:

1. A secondary battery comprising a negative electrode plate, the negative electrode plate comprising a negative active material, wherein the negative active material comprises an artificial graphite having a volume average particle size $D_v50$ of 12 μm to 22 μm and an SSA of 0.56 to 1.35, and the artificial graphite satisfies: $12 \leq D_v50 \times SSA \leq 25$, in which SSA is the specific surface area of the artificial graphite, in $m^2/g$;

the artificial graphite has a particle size span $(D_v90 - D_v10)/D_v50$ of 1.1 to 1.5;

the artificial graphite has a volume particle size $D_v10$ satisfying 6.2 μm≤$D_v10$≤10.8 μm;

the artificial graphite has a numerical particle size $D_n10$ satisfying: 0.43 μm≤$D_n10$≤1.8 μm;

the negative electrode plate has a compaction density of 1.6 $g/cm^3$ to 1.75 $g/cm^3$, and the negative electrode plate has an OI value from 6 to 15, wherein the OI value of the negative electrode plate represents a ratio $C_{004}/C_{110}$, in which $C_{004}$ is the peak area of the diffraction peak of 004 crystal plane of the artificial graphite in the negative electrode plate and $C_{110}$ is the peak area of the diffraction peak of 110 crystal plane of the artificial graphite in the negative electrode plate.

2. The secondary battery according to claim 1, wherein the artificial graphite has a volume average particle diameter $D_v50$ of 15 μm to 18 μm.

3. The secondary battery according to claim 1, wherein the artificial graphite satisfies: $15 \leq D_v50 \times SSA \leq 22$.

4. The secondary battery according to claim 1, wherein the negative electrode plate has a compaction density of 1.6 $g/cm^3$ to 1.7 $g/cm^3$.

5. The secondary battery according to claim 1, wherein the OI value of the negative electrode plate is from 8 to 12.

6. The secondary battery according to claim 1, wherein: the artificial graphite has a volume particle size $D_v10$ satisfying: $D_v10 \geq 6$ μm.

7. The secondary battery according to claim 1, wherein artificial graphite has a graphitization degree of 90% to 95%;

the artificial graphite has a tap density of 0.85 $g/cm^3$ to 1.35 $g/cm^3$;

the artificial graphite has a powder compaction density of 1.65 $g/cm^3$ to 1.85 $g/cm^3$ under a pressure of 2000 kg;

the artificial graphite has a D peak intensity $I_D$ and a G peak intensity $I_G$, and the ratio $I_D/I_G$ satisfies: $I_D/I_G \leq 0.25$;

the artificial graphite has a gram capacity of 350 mAh/g to 359 mAh/g.

8. The secondary battery according to claim 1, wherein the artificial graphite has a numerical particle size $D_n10$ satisfying: 1 μm≤$D_n10$≤1.8 μm.

9. The secondary battery according to claim 1, wherein the artificial graphite comprises secondary particles formed by agglomeration of primary particles; a proportion of a number of the secondary particles in the artificial graphite is at least 60%.

10. The secondary battery according to claim 9, wherein a proportion of a number of the secondary particles in the artificial graphite is from 70% to 90%.

11. The secondary battery according to claim 1, wherein at least one of the following conditions is satisfied:

(1) the artificial graphite satisfies: $16 \leq D_v50 \times SSA \leq 21$; or (2) the artificial graphite has a volume particle size $D_v10$ satisfying: 6.5 μm≤$D_v10$≤10.5 μm; or (3) the artificial graphite has a particle size span $(D_v90-D_v10)/D_v50$ of 1.2 to 1.5; or (4) the artificial graphite has a graphitization degree of 92% to 94%; or (5) the artificial graphite has a tap density of 0.95 $g/cm^3$ to 1.15 $g/cm^3$; or (6) the artificial graphite has a powder compaction density of 1.68 $g/cm^3$ to 1.83 $g/cm^3$ under a pressure of 2000 kg; or (7) the artificial graphite has a D peak intensity $I_D$ and a G peak intensity $I_G$, and the ratio $I_D/I_G$ satisfies: $0.1 \leq I_D/I_G \leq 0.2$; or (8) the artificial graphite has a gram capacity of 352 mAh/g to 355 mAh/g.

12. An artificial graphite, wherein the artificial graphite has a volume average particle size $D_v50$ of 12 μm to 22 μm and an SSA of 0.56 to 1.35, the artificial graphite has a particle size span $(D_v90-D_v10)/D_v50$ of 1.1 to 1.5, and the artificial graphite satisfies: $12 \leq D_v50 \times SSA \leq 25$, in which SSA is the specific surface area of the artificial graphite, in $m^2/g$; wherein the artificial graphite has a volume particle size $D_v10$ satisfying 6.2 μm≤$Dv10$≤10.8 μm; the artificial graphite has a numerical particle size $D_n10$ satisfying: 0.43 μm≤$D_n10$≤1.8 μm; when the artificial graphite is used in a negative electrode with a compaction density of 1.6 $g/cm^3$ to 1.75 $g/cm^3$, the artificial graphite has a peak area $C_{004}$ of the 004 crystal plane and a peak area $C_{110}$ of the 110 crystal plane satisfying $6 \leq C_{004}/C_{110} \leq 15$.

13. A method for preparing an artificial graphite, comprising the following steps:

(1) crushing green coke materials and classifying them;

(2) shaping the product obtained in step (1);

(3) granulating the product obtained in step (2), wherein the amount of binder added during the granulation process does not exceed 5% of the total weight of the green coke materials;

(4) subjecting the product obtained in step (3) to a graphitization treatment at a temperature of 2800° C.~3200° C. to obtain the artificial graphite;

wherein the artificial graphite has a volume average particle size $D_v50$ of 12 μm to 22 μm and an SSA of 0.56 to 1.35, and the artificial graphite satisfies:

$12 \leq D_v 50 \times SSA \leq 25$, in which SSA is the specific surface area of the artificial graphite, in $m^2/g$; when the artificial graphite is used in a negative electrode with a compaction density of 1.6 $g/cm^3$ to 1.75 $g/cm^3$, the artificial graphite has a peak area $C_{004}$ of the 004 crystal plane and a peak area Clio of the 110 crystal plane satisfying $6 \leq C_{004}/C_{110} \leq 15$; and wherein the artificial graphite has a numerical particle size $D_n 10$ satisfying: 0.43 $\mu m \leq D_n 10 \leq 1.8$ $\mu m$; wherein the artificial graphite has a particle size span $(D_v 90 - D_v 10)/D_v 50$ of 1.1 to 1.5, the artificial graphite has a volume particle size $D_v 10$ satisfying 6.2 $\mu m \leq D_v 10 \leq 10.8$ $\mu m$.

14. The method according to claim 13, wherein the green coke comprises one or more of green petroleum coke, green pitch coke and metallurgical coke.

15. The method according to claim 13, wherein the green coke is non-needle coke.

16. The method according to claim 13, wherein the green coke has a volatile content of 6%-12%; and/or,
the green coke has a sulfur content of $\leq 2\%$.

17. The method according to claim 13, wherein in step (3), the product obtained in step (2) is granulated without adding a binder.

18. The method according to claim 13, wherein the step (2) further comprises removing fine powder after shaping; preferably, the number particle size $D_n 10$ of the granular product after step (2) is controlled to be $\geq 0.5$ $\mu m$, through a fine powder removal treatment.

19. The method according to claim 13, wherein the product obtained in step (3) is graphitized at a temperature of 2900° C. to 3100° C.

\* \* \* \* \*